United States Patent
Scholte

(10) Patent No.: US 7,447,211 B1
(45) Date of Patent: Nov. 4, 2008

(54) METHOD AND APPARATUS OF ESTABLISHING A COMMUNICATION CHANNEL USING PROTECTED NETWORK RESOURCES

(75) Inventor: Alexander M. Scholte, Chatswood (AU)

(73) Assignee: Avaya Inc., Basking Ridge, NJ (US)

( * ) Notice: Subject to any disclaimer, the term of this patent is extended or adjusted under 35 U.S.C. 154(b) by 725 days.

(21) Appl. No.: 10/808,172

(22) Filed: Mar. 23, 2004

(51) Int. Cl.
H04L 12/28 (2006.01)

(52) U.S. Cl. .................................. 370/395.21

(58) Field of Classification Search ............... 370/352, 370/458, 468, 400, 234, 337, 401, 431, 443
See application file for complete search history.

(56) References Cited

U.S. PATENT DOCUMENTS

| | | | |
|---|---|---|---|
| 5,802,058 A | 9/1998 | Harris et al. | |
| 5,946,311 A * | 8/1999 | Alexander et al. | 370/395.53 |
| 6,118,785 A | 9/2000 | Araujo et al. | |
| 6,201,791 B1 * | 3/2001 | Bournas | 370/234 |
| 6,252,857 B1 * | 6/2001 | Fendick et al. | 370/254 |
| 6,353,616 B1 * | 3/2002 | Elwalid et al. | 370/443 |
| 6,353,856 B1 * | 3/2002 | Kanemaki | 709/229 |
| 6,389,038 B1 | 5/2002 | Goldberg et al. | |
| 6,434,139 B1 | 8/2002 | Liu et al. | |
| 6,438,137 B1 | 8/2002 | Turner et al. | |
| 6,449,344 B1 | 9/2002 | Goldfinger et al. | |
| 6,453,349 B1 * | 9/2002 | Kano et al. | 709/226 |
| 6,477,164 B1 | 11/2002 | Vargo et al. | |
| 6,483,835 B1 * | 11/2002 | Tanigawa et al. | 370/395.21 |
| 6,515,966 B1 | 2/2003 | Bardalai et al. | |
| 6,519,254 B1 | 2/2003 | Chuah et al. | |
| 6,563,793 B1 * | 5/2003 | Golden et al. | 370/236 |
| 6,577,613 B1 * | 6/2003 | Ramanathan | 370/337 |
| 6,598,080 B1 * | 7/2003 | Nagami et al. | 709/227 |
| 6,678,474 B1 | 1/2004 | Masuda et al. | |
| 6,763,392 B1 * | 7/2004 | del Val et al. | 709/231 |
| 6,816,500 B1 * | 11/2004 | Mannette et al. | 370/431 |
| 6,931,025 B1 | 8/2005 | Masuda | |
| 6,931,448 B2 * | 8/2005 | Holler et al. | 709/227 |
| 6,934,249 B1 * | 8/2005 | Bertin et al. | 370/218 |
| 6,967,927 B1 * | 11/2005 | Dugeon et al. | 370/236.1 |
| 6,970,450 B1 | 11/2005 | Scott | |
| 7,009,994 B2 * | 3/2006 | Bahl | 370/458 |
| 7,116,682 B1 * | 10/2006 | Waclawsky et al. | 370/468 |

(Continued)

FOREIGN PATENT DOCUMENTS

JP 62-219732 9/1987

(Continued)

OTHER PUBLICATIONS

U.S. Appl. No. 09/359,850, filed Feb. 7, 2003, Scholte.

(Continued)

*Primary Examiner*—Huy D. Vu
*Assistant Examiner*—Abdullah Riyami
(74) *Attorney, Agent, or Firm*—Sheridan Ross P.C

(57) ABSTRACT

A method and apparatus for tunneling connection messages as part of data packets for reserving network resources. In particular, objects containing messages for use in establishing communication channels are defined as part of data packets comprising resource reservation messages. The defined objects need only be recognized by channel endpoints. Accordingly, the present invention may be implemented by suitably configuring the endpoints.

17 Claims, 3 Drawing Sheets

U.S. PATENT DOCUMENTS

| | | | |
|---|---|---|---|
| 7,126,939 B2* | 10/2006 | Barany et al. | 370/352 |
| 7,139,263 B2 | 11/2006 | Miller et al. | |
| 7,143,191 B2* | 11/2006 | Chuah et al. | 709/247 |
| 2001/0025321 A1 | 9/2001 | Tang et al. | |
| 2002/0031142 A1* | 3/2002 | Metin et al. | 370/463 |
| 2002/0087699 A1 | 7/2002 | Karagiannis et al. | |
| 2002/0097798 A1* | 7/2002 | Manor | 375/240.02 |
| 2003/0115390 A1* | 6/2003 | Iijima | 710/104 |
| 2003/0133459 A1 | 7/2003 | Siddiqui et al. | |
| 2003/0161322 A1* | 8/2003 | Shaheen et al. | 370/395.21 |
| 2003/0229690 A1 | 12/2003 | Kitani et al. | |
| 2004/0022247 A1* | 2/2004 | Chen et al. | 370/395.5 |
| 2004/0081151 A1* | 4/2004 | Greis et al. | 370/392 |
| 2004/0085949 A1* | 5/2004 | Partanen et al. | 370/352 |
| 2004/0109459 A1* | 6/2004 | Madour et al. | 370/401 |
| 2004/0132481 A1* | 7/2004 | Sugaya | 455/550.1 |
| 2004/0139088 A1* | 7/2004 | Mandato et al. | 707/100 |
| 2004/0151206 A1 | 8/2004 | Scholte | |
| 2004/0196825 A1* | 10/2004 | Scholte | 370/351 |
| 2004/0196843 A1* | 10/2004 | Zinin | 370/389 |
| 2005/0013287 A1* | 1/2005 | Wallentin et al. | 370/352 |
| 2005/0117580 A1* | 6/2005 | del Val et al. | 370/395.2 |
| 2005/0207340 A1* | 9/2005 | O'Neill | 370/230 |
| 2005/0216776 A1* | 9/2005 | Watanabe | 713/300 |
| 2005/0226235 A1* | 10/2005 | Kumar et al. | 370/386 |
| 2006/0114889 A1* | 6/2006 | Schneider et al. | 370/352 |
| 2006/0168337 A1* | 7/2006 | Stahl et al. | 709/240 |
| 2006/0182117 A1* | 8/2006 | Chen et al. | 370/395.5 |
| 2006/0233333 A1* | 10/2006 | Brombal et al. | 379/114.2 |
| 2006/0256719 A1* | 11/2006 | Hsu et al. | 370/230 |
| 2007/0115825 A1 | 5/2007 | Roberts | |
| 2007/0242677 A1* | 10/2007 | Shaheen et al. | 370/395.21 |
| 2008/0019386 A1* | 1/2008 | Chen et al. | 370/401 |

FOREIGN PATENT DOCUMENTS

| | | |
|---|---|---|
| JP | 2000-138711 | 5/2000 |
| JP | 2000-174818 | 6/2000 |
| JP | 2002-141932 | 5/2002 |
| JP | 2002-190825 | 7/2002 |
| JP | 2002-354020 | 12/2002 |
| WO | WO 00/11849 | 3/2000 |
| WO | WO 02/13023 | 2/2002 |

OTHER PUBLICATIONS

Braden, R., et al., "Resource ReSerVation Protocol (RSVP)," Network Working Group, RFC 2205 (Sep. 1997), pp. 1-112.

Bernet, Y, "Format of the RSVP DCLASS Object," Network Working Group, RFC 2996 (Nov. 2000) pp. 1-7.

Thompson, Bruce et al., "Tunneling Multiplexed Compressed RTP ("TCRTP")," Internet draft document of The Internet Engineering Task Force, Feb. 27, 2002, The Internet Society.

Thompson, Bruce et al., Tunneling Multiplexed Compressed RTP ("TCRTP"), Internet draft document of The Internet Engineering Task Force, Jul. 19, 2001, available at http://www.ietf.org/proceedings/01aug/1-D/draft-ietf-avt-tcrtp-04.txt, The Internet Society.

Tanigawa, Keiko et al., "Simple RTP Multiplexing Transfer Methods for VOIP," Internet draft document of The Internet Engineering Task Force, Nov. 18, 1998, available at http://www.ietf.org/proceedings/02mar/I-D/draft-ieft-avt-tcrtp-06.txt, The Internet Society.

European Patent Office Communication attaching Search Report for European Patent Application No. 04259532.1 dated Oct. 4, 2004.

European Examination Report for European Patent Application No. 04250650.1 dated Dec. 8, 2004 pp. 1-8.

Vamosi, Robert, "The next hacker target: instant messaging," ZDNET Reviews (May 30, 2002), available at http://zdnet.com.com/2100-1107-928415.html, 3 pages.

Background of the Invention for the above-captioned application (previously provided) May 22, 2004.

U.S. Appl. No. 10/675,719, filed Sep. 29, 2003, Roush et al.

U.S. Appl. No. 11/036,305, filed Jan. 13, 2005, Corliss et al.

"Risk Exposure Through Instant Messaging and Peer-To-Peer (P2P) Networks," An X-Force™ White Paper, Internet Security Systems, Inc. (Apr. 2002), pp. 1-27.

"Special Report: Taking the voice over IP plunge," NetworkWorld (2003), pp. 1-12.

"The Instant Messaging Standards Race: Comparing XMPP/Jabber and SIP/SIMPLE," Jabber, Inc., Version 1.0 (May 2003), pp. 1-11.

Article entitled, "Instant Messaging Guide—ICQ (I Seek You)," ViewZ Instant Messaging Guide (May 23, 2003), available at http://www.viewz.com/features/imguide2.shtml, 3 pages.

Article entitled, "Jabbar:: Protocol—Authentication," Jabber Software Foundation (1999-2003), available at http://www.jabber.org/protocol/authentication.html, 1 page.

Article entitled, "Jabber:: Protocol—Core Data Elements," Jabber Software Foundation (1999-2003), available at http://www.jabber.org/protocol/coredata.html, 7 pages.

Article entitled, "Jabber:: Protocol—How File Transfer Works," Jabber Software Foundation (1999-2003), available at http://www.jabber.org/protocol/filetransfer.html, 3 pages.

Article entitled, "Jabber:: Protocol—XML Streams," Jabber Software Foundation (1999-2003), available at http://www.jabber.org/protocol/xmlstreams.html, 6 pages.

Article entitled, "Jabber::Protocol—Delayed Delivery," available at Jabber Software Foundation (1999-2003), http://www.jabber.org/protocol/delay.html, 3 pages.

Article entitled, "Jabber::Protocol—Groupchat," Jabber Software Foundation (1999-2003), available at http://www.jabber.org/protocol/groupchat.html, 4 pages.

Article entitled, "Jabber::Protocol—Presence Subscriptions," Jabber Software Foundation (1999-2003), available at http://www.jabber.org/protocol/subscriptions.html, 15 pages.

Cherry, Steven, "IM Means Business," IEEE Spectrum (Nov. 2002), pp. 28-32.

Hildebrand, Joe, et al., "Allow access to a Jabber server from behind firewalls which do not allow outgoing sockets on port 5222, via HTTP requests," Jabber Enhancement Proposal No. 0025, available at http://www.jabber.org/jeps/jep-0025.html, downloaded May 22, 2003, 7 pages.

Huuhtanen, Juha, "Real-Time Streaming Protocol (RTSP)," Dept. of Computer Science and Engineering, Helsinki University of Technology (Nov. 22, 1998), available at http://www.tcm.hut.fi/Studies/Tlk-110.300/1998/Essays/rtsp.html, 7 pages.

Millard, Peter, "A protocol for managing server-side blacklist and whitelist rules," Jabber Enhancement Proposal No. 0016, Jabber Software Foundation, available at http://www.jabber.org/jeps/jep-0016.html, downloaded May 22, 2003 (7 pages).

Millard, Peter, "A protocol which allows two jabber endpoints to negotiate feature options between themselves," Jabber Enhancement Proposal No. 0020, Jabber Software Foundation, available at http://www.jabber.org/jeps/jep-0020.html, downloaded May 22, 2003 (15 pages).

Miller, Jeremie, et al., "Jabber protocol elements can be given an expiry date/time, a "use-by" timestamp, by attaching to it an <x/> extension qualified by the jabber:x:expire namespace," Jabber Enhancement Proposal No. 0023, Jabber Software Foundation, available at http://www.jabber.org/jeps/jep-0023.html, downloaded May 22, 2003 (4 pages).

Miller, Matthew, "A protocol for reporting and executing ad-hoc, human-oriented commands in Jabber," Jabber Enhancement Proposal No. 0050, Jabber Software Foundation, available at http://www.jabber.org/jeps/jep-0050.html, downloaded May 22, 2003 (16 pages).

Ridgway, Neil, "The Real Time Streaming Protocol (RTSP)," (Sep. 7, 1998), available at http://www.mmrg.ecs.soton.ac.uk/publications/archive/ridgway1998/html/node29.html, 2 pages.

Ridgway, Neil, "The Real-time Transport Protocol (RTP)," (Sep. 7, 1998), available at http://www.mmrg.ecs.soton.ac.uk/publications/archive/ridgway1998/html/node23.html, 2 pages.

Saint-Andre, Peter, "A robust protocol for text-based conferencing in Jabber," Jabber Enhancement Proposal No. 0045, Jabber Software Foundation, available at http://www.jabber.org/jeps/jep-0045.html, downloaded May 22, 2003 (82 pages).

Schulzrinne, H., et al., "RTP: A Transport Protocol for Real-Time Applications," Network Working Group RFC 1889 (Jan. 1996), available at http://www.iptel.org/info/players/ietf/media/rfc1889.txt, pp. 1-75.

Sjoberg, J., et al., "Real-Time Transport Protocol (RTP) Payload Format and File Storage Format for the Adaptive Multi-Rate (AMR) and Adaptive Multi-Rate Wideband (AMR-WB) Audio Codecs," Network Working Group RFC 3267 (Jun. 2002), available at http://rfc.sunsite.dk/rfc/3267.html, pp. 1-49.

Smith, Spencer, "Be Aware of Security Issues with ICQ Instant Messaging," Computing News (Spring 2000), available at http://cc.uoregon.edu/cnews/spring2000/icq.html, 5 pages.

Tyson, Jeff, "How Instant Messaging Works," HowStuffWorks, Inc., available at wysiwyg://65/http://www.howstuffworks.com/Instant-messaging.htm, downloaded May 22, 2003, 3 pages.

Vamosi, Robert, "The next hacker target: instant messaging," ZDNET Reviews (May 30, 2002), available at http://zdnet.com.com/2100-1107-928415.html, 3 pages.

Background of the Invention for the above-captioned application (previously provided).

* cited by examiner

METHOD AND APPARATUS OF ESTABLISHING A COMMUNICATION CHANNEL USING PROTECTED NETWORK RESOURCES

FIELD OF THE INVENTION

The present invention is directed to establishing a communication channel using protected network resources. In particular, the present invention relates to embedding objects related to establishing a communication channel in data packets for reserving network resources.

BACKGROUND OF THE INVENTION

Various mechanisms for providing minimum quality of service levels with respect to Internet protocol packet flows have been developed. For example, the resource reservation protocol (RSVP) can be used to reserve bandwidth and nominate the desired quality of service (QoS) treatment for a particular network packet flow between two or more network endpoints. Use of RSVP involves sending data packets across a communication network to reserve resources at points along a path or paths that will be used in connection with a communication channel. In particular, the IP addresses of network nodes or routers along the path are collected, and resources on those nodes reserved.

The establishment of protected or reserved network resources can fail for various reasons. For example, the requested resources may not be available. Determining whether requested bandwidth can be reserved at a desired QoS treatment requires sending an RSVP path packet, receiving a RSVP reservation packet, and sending an RSVP confirmation packet. Accordingly, making a determination as to whether requested resources are available takes time.

In connection with reserved network resources, a network packet flow using such resources must usually be established separately. For example, a connection may be established according to the procedures of a protocol such as the transmission control protocol (TCP) or the session initiation protocol (SIP). In general, the establishment of a connection according to such a protocol requires an exchange of messages between endpoints of the communication channel. For various reasons, a requested communication channel may be unavailable.

Accordingly, the establishment of a communication channel using protected network resources requires both the reservation of resources and the establishment of a communication channel. If the steps of obtaining resource reservations is performed in series with the steps of establishing a communication channel to utilize the reserved resources, the process is approximately twice as time consuming. As an alternative, the steps of making resource reservations and establishing a communication channel can be performed in parallel or interleaved with one another. However, even if such steps are performed in parallel, the use of reserved network resources in connection with a communication channel involves increased setup times as compared to a communication channel established without a reservation of network resources. Also, data packet traffic on the network is increased.

In addition, existing methods of establishing communication channels using reserved resources are inefficient. In particular, if one or the other of a requested reservation or communication channel is established, but the other fails, the established reservation or channel must be torn down, and the process must be restarted.

SUMMARY OF THE INVENTION

The present invention is directed to solving these and other problems and disadvantages of the prior art. According to an embodiment of the present invention, an object is defined as part of a resource reservation protocol that is capable of tunneling an IP packet in the data packet messages used to reserve the requested resources. The present invention may be used to establish a connection between endpoints where reservation packets are exchanged between those same two endpoints. For example, the present invention may be used to transport connection set up sequence messages used by various communication protocols, such as the transmission control protocol (TCP), the stream control transmission protocol (SCTP) and the session initiation protocol (SIP). In general, the present invention may be used in connection with any Internet protocol (IP) based protocol that uses a three way handshake to establish a communications session.

In accordance with an embodiment of the present invention, messages used to establish a communication channel are mapped to messages used to establish reserved network resources. Accordingly, a single set of data packets may be used to establish both the requested channel and resource reservations. Furthermore, because the required messages are sent simultaneously, a failure to obtain either the requested reservation of resources or the requested communication channel can be apparent sooner and handled more simply by software than using prior art techniques.

DETAILED DESCRIPTION

Figure 1:
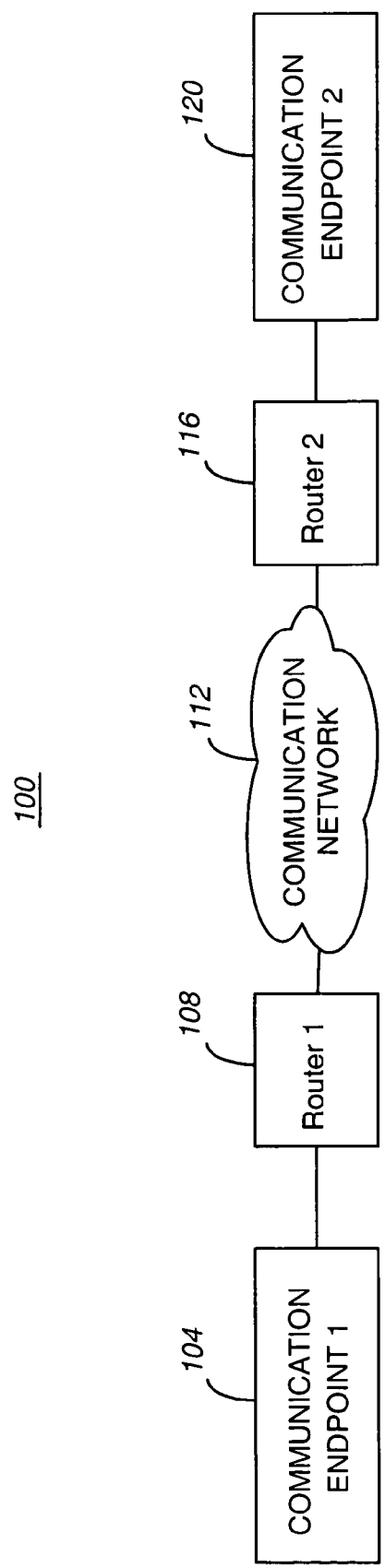
FIG. 1 is a block diagram of a communication arrangement in accordance with an embodiment of the present invention.

The present invention is related to tunneling Internet protocol packets included as part of packets sent in connection with reserving communication network resources. With reference now to FIG. 1, a communication arrangement in accordance with an embodiment of the present invention is illustrated. In general, the communication arrangement 100 includes a first communication endpoint 104 interconnected to a first router 108. The first router 108 is in turn connected to a communication network 112. The communication network 112 is interconnected to a second router 116. The second router 116 is in turn connected to a second communication endpoint 120.

The first and second communication endpoints 104, 120 may comprise any source or receiver of communications data. Accordingly, the communication endpoints 104, 120 may comprise network nodes, such as general purpose computers, routers or gateways. Particular examples of communication endpoints 104, 120 include Internet protocol (IP) telephones, implemented in hardware or software, for example as part of general purpose computers. Other examples of communication endpoints 104, 120 include media terminals and servers. The routers 108, 116 function to interconnect the communication endpoints 104, 120 to the communication network 112. Accordingly, the routers 108, 116 may comprise IP routers. The communication network 112 may comprise one or more networks, of one or more types. For example, the communication network 112 may comprise a packet data network or combination of packet data and switched circuit networks. As a further example, the communication network 112 may comprise the Internet, intranet, or a combination of one or more intranets and the Internet. As can also be appreciated by one of skill in the art, the communication network 112 may comprise either or both of the first and second routers 108, 116. In addition, it should be appreciated that the routers 108, 116 are not necessary to the present invention.

For purposes of description, the establishment of a communication channel between the first and second communication endpoints 104, 120 will be explained in connection with the establishment of a voice telephony communication session using reserved network resources. However, it should be appreciated that the present invention is not so limited. For example, the present invention may be used in connection with reserving resources and establishing communication channels for use in connection with packet data flows for any purpose, including or in addition to any type of real-time transfer protocol (RTP) communications.

Figure 2:
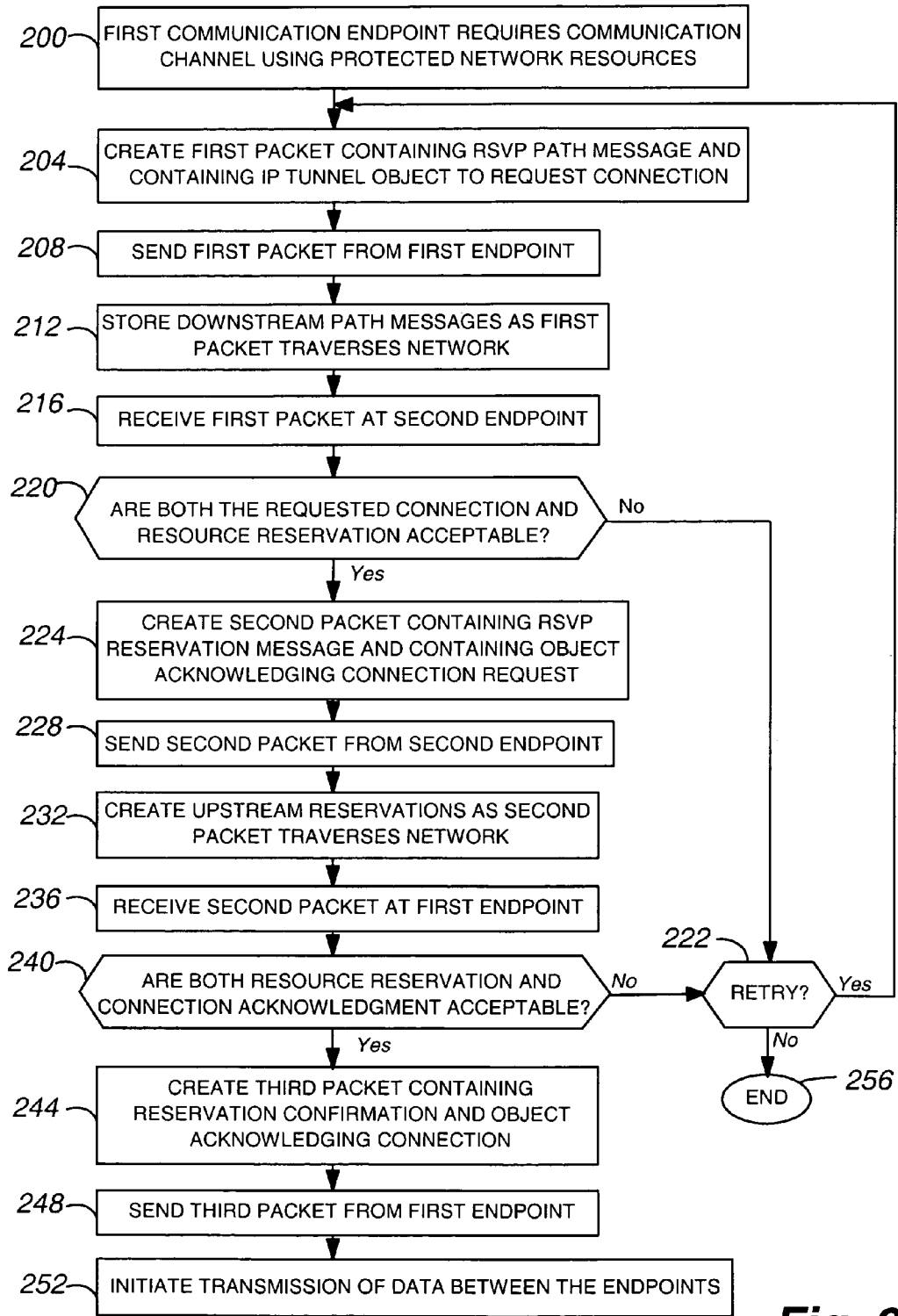
FIG. 2 is a flowchart depicting the operation of an embodiment of the present invention.

With reference now to FIG. 2, the operation of an embodiment of the present invention is illustrated. Initially, at step 200, a first communication endpoint 104 requires a communication channel using protected network resources. At step 204, a first data packet containing a request to reserve resources, such as an RSVP path message, and containing an object comprising a data packet requesting a connection or channel, is created. As can be appreciated by one of skill in the art, data packets for use in connection with initiating the reservation of network resources may contain a number of objects. According to the present invention, such data packets also include an object comprising a data packet or message for initiating a communication channel. As will be appreciated from the description provided herein, the present invention thus allows a single data packet to accomplish initiating the reservation of resources and initiating the establishment of a communication channel.

At step 208, the first data packet is sent from the first communication endpoint 104. As the first data packet traverses the communication network 112, downstream path messages are stored conventionally (step 212). According to an embodiment of the present invention, nodes on the network 112 that are intermediate to the first and second communication endpoints 104, 120 are not required to recognize the object containing the request for a communication channel. Accordingly, such network nodes simply ignore that object, and instead take action based on other objects included in the first data packet. Eventually, assuming the transmission is successful, the first packet is received at the second communication endpoint 120 (step 216).

At step 220, the second communication endpoint 120 recognizes the message initiating the request for a reservation of network resources and the embedded message for initiating a communication channel, and a determination is made as to whether both the requested connection and requested resource reservation are acceptable. If the second communication endpoint 120 confirms that the requested resource reservation and the requested connection are acceptable, a second data packet containing a resource reservation message and comprising an object acknowledging the connection request is created (step 224). The second data packet is then sent from the second communication endpoint 120 (step 228). Upstream reservations are created on network nodes within the communication network 112 as the second data packet traverses the network (step 232). As the upstream reservations are created, nodes on the network 112 are not required to recognize the object containing an acknowledgment of the connection request, and may ignore that object. Provided the transmission of the packet is successful, the second data packet is received at the first communication endpoint 104 (step 236).

At step 240, the first communication endpoint 104 recognizes the resource reservation message and the embedded message acknowledging the connection request, and a determination is made as to whether both the resource reservation and connection acknowledgment are acceptable. If they are not acceptable, the establishment of a resource reservation and communication channel can be retried (step 222). If the resource reservation and connection acknowledgements are acceptable, a third data packet comprising a reservation confirmation and containing an object acknowledging the connection is created (step 244). The third data packet is then sent from the first communication endpoint 104 to the second communication endpoint 120 (step 248). Again, any intermediate network nodes are not required to recognize the embedded object acknowledging the connection. The transmission of data between the endpoints 104, 120 may then be initiated (step 252).

If an attempted retry (step 222) is made, the process returns to step 204. If no retry is to be attempted, the process ends (step 256). As can be appreciated by one of skill in the art, the process may be retried or abandoned if a time period allotted for receiving a data packet in response to a preceding packet within a handshake sequence expires or if a required message is not received at any point.

Figure 3:
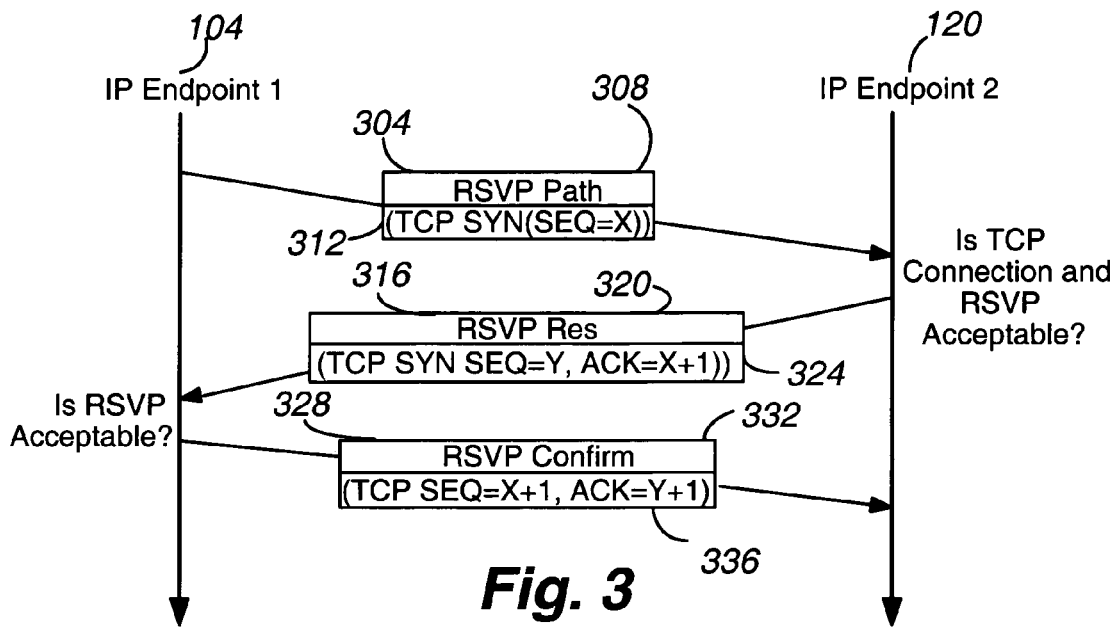
FIG. 3 depicts an exchange of messages in accordance with an embodiment of the present invention.

With reference now to FIG. 3, an exchange of messages in connection with the establishment of resource reservations for a transmission control protocol connection is illustrated. Initially, a first communication endpoint 104, shown as IP endpoint 1 in FIG. 3, sends a data packet 304 comprising an RSVP path message 308, and containing a TCP SYN (SEQ=X) message 312. As the data packet 304 traverses the network 112 between the first communication endpoint 104 and the second communication endpoint 120 (shown as IP Endpoint 2 in FIG. 3) path information is stored on network nodes (e.g., on routers 108, 116). Eventually, the first data packet 304 is received at the second communication endpoint 120, and a determination is made as to whether the requested TCP connection and RSVP are acceptable.

If the requested TCP connection and RSVP are acceptable, a second data packet 316 comprising an RSVP RES message 320 and containing a TCP SYN (SEQ=Y, ACK=X+1) data packet 324 is returned to the first communication endpoint 104. As the second data packet 316 traverses the communication network 112, IP address information regarding the network nodes encountered is collected. When the second data packet 316 is received by the first communication endpoint 104, a determination is made as to whether the RSVP is acceptable.

If the RSVP is acceptable, a third data packet 328 comprising an RSVP confirm message 332 and containing a TCP SEQ=X+1, and an ACK=Y+1 message 336 is sent to the second communication endpoint 120. A TCP connection using reserved resources can thus be established using only three separate data packets 304, 316, 328, as compared to requiring at least 6 separate data packets using prior art methods.

Figure 4:
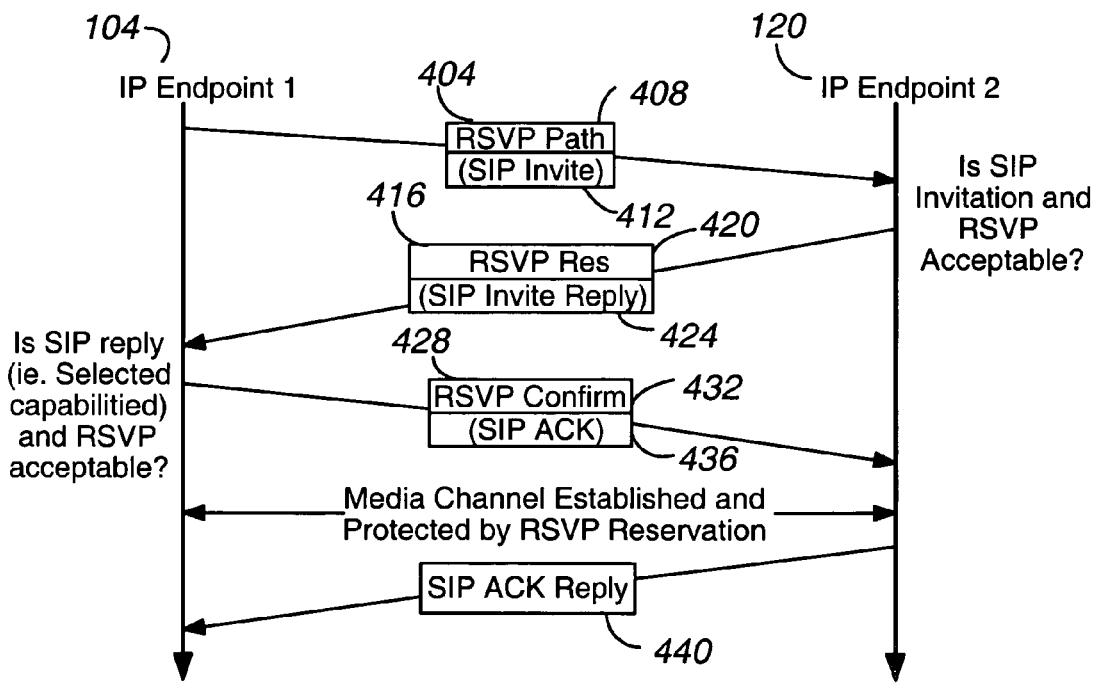
FIG. 4 depicts an exchange of messages in accordance with another embodiment of the present invention.

With reference now to FIG. 4, SIP media establishment using reserved network resources in accordance with an embodiment of the present invention is illustrated. As shown in FIG. 4, the first communication endpoint 104 sends a first data packet 404 comprising an RSVP path message 408 that contains an SIP invite message 412 to the second communication endpoint 120. The second communication endpoint 120 then determines whether the SIP invitation and RSVP are acceptable.

If the SIP invitation and RSVP are acceptable, a second data packet 416 comprising an RSVP RES message 420 containing an SIP invite reply object 424 is returned to the first communication endpoint 104. The first communication endpoint 104 then determines whether the SIP reply and RSVP are acceptable.

If the SIP reply and RSVP are acceptable, a third data packet 428 comprising an RSVP confirm message 432 containing an object comprising an SIP ACK message 436 is returned to the second communication endpoint 120. A media channel that is protected by an RSVP reservation is thus established. The second communication endpoint 120 may then send a fourth data packet 440 comprising an SIP ACK reply message to the first communication endpoint 104. Data packet flow using the media channel may then commence.

As can be appreciated, the data object contained in a data packet comprising a message for reserving resources on a network can contain any IP packet that is destined for the same address as the message packet. Accordingly, the data object or objects included as part of a resource reservation message is not limited to those of the type described in the examples provided herein. Likewise, the data object may be defined for other methods and protocols for reserving network resources in addition to RSVP, such as resource reservation protocol traffic engineering (RSVP-TE) and Constraint-Based LSP Setup using LDP (CR-LDP).

In addition, in connection with establishing communication channels in accordance with protocols such as TCP or SIP, any intermediate nodes should typically recognize messages concerning a request for network resources, but are not required to recognize the embedded objects. Instead, those objects and the messages they contain need only be recognized by the communication channel endpoints (e.g., communication endpoints 104, 120). Accordingly, implementation of embodiments of the present invention only requires that the communication channel endpoints (or network nodes that otherwise should recognize embedded objects) be modified or created with the capability to recognize objects embedded as disclosed herein.

As can be appreciated by one of skill in the art, the disclosed invention can be used in connection with packet data communication networks 112. As can further be appreciated, the configuration shown in FIG. 1 is exemplary. Accordingly, any communication arrangement comprising a packet data communication network over which resources may be reserved may be used in implementing the present invention.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method of establishing a communication channel using protected network resources, comprising:

creating a first data packet that contains:
   an RSVP path message requesting a reservation of network resources; and
   a first object in addition to the RSVP path message, comprising a connection request, wherein said first object comprises a communications protocol object;
sending said first data packet from a first communication endpoint across a network to a second communication endpoint;
determining whether both said requested reservation of network resources and said requested connection are acceptable;
in response to determining that both said requested reservation of network resources and said requested connection are acceptable, creating a second data packet that contains:
   an RSVP reservation message related to said request for network resources; and
   a second object in addition to the RSVP reservation message, comprising a first connection request acknowledgement, wherein said second object comprises a communications protocol object;
sending said second data packet from said second communication endpoint to said first communication endpoint;
determining at said first communication endpoint whether said RSVP reservation message and said first connection request acknowledgment received from said second communication endpoint as part of said second data packet are acceptable;
in response to determining that both said RSVP reservation message and said first connection request acknowledgment received from said second communication endpoint as part of said second data packet are acceptable, creating a third data packet that contains:
   an RSVP confirm message confirming said reservation of network resources; and
   a third object in addition to the RSVP confirm message, comprising a second connection request acknowledgement, wherein said third object comprises a communications protocol object; and
sending said third data packet from said first communication endpoint to said second communication endpoint,
wherein a communication channel between said first communication endpoint and said second communication endpoint is established by said connection request and said connection request acknowledgement objects, and
wherein bandwidth on said network is reserved by said RSVP path and said RSVP reservation messages.

2. The method of claim 1, wherein said first, second and third objects comprise transmission control protocol messages.

3. The method of claim 1, wherein said first, second and third objects comprise session initiation protocol messages.

4. The method of claim 1, further comprising:
receiving said first packet at a first network node intermediate to said first and second communication endpoints, said first network node:
   acting on said request for a reservation of network resources; and
   ignoring said first object.

5. The method of claim 4, further comprising:
receiving said second packet at least one of said first network node and a second network node, said at least one network node:
   acting on said RSVP reservation message; and
   ignoring said second object.

6. The method of claim 5, further comprising:
receiving said third packet at least one of said first network node and said second network node, said at least one network node:
    acting on said RSVP confirmation message; and
    ignoring said third object.

7. The method of claim 1, further comprising:
sending data across said reserved network resources between said first and second communication endpoints.

8. The method of claim 1, wherein said first communication endpoint comprises one of a telephony device and a general purpose computer.

9. The method of claim 1, wherein said network node comprises one of a router or gateway.

10. A method for establishing a communications channel, the method comprising:
creating at a first communication endpoint a first data packet that contains:
    a message comprising a request for a reservation of network resources; and
    a first object in addition to the message, comprising a connection request, wherein said first object comprises a communications protocol object;
sending said first data packet across a network;
receiving at said first communication endpoint a second data packet that contains:
    a message comprising a resource reservation message; and
    a second object in addition to the message, comprising a connection request acknowledgement, wherein said second object comprises a communications protocol object; and
creating at said first communication endpoint a third data packet that contains:
    a message comprising a confirmation of said reservation of network resources; and
    a third object in addition to the message, comprising a second connection request acknowledgement, wherein said third object comprises a communications protocol object;
sending said third data packet across said network,
wherein a communication channel is established between said first communication endpoint and a second communication endpoint by said objects comprising a connection request and connection request acknowledgement, and
wherein bandwidth on said network is reserved by said messages comprising a resource reservation and confirmation of reservation of network resources.

11. The method of claim 10, further comprising:
sending data using said reserved network resources.

12. The method of claim 10, wherein said objects comprise one of transmission control protocol and session initiation protocol objects.

13. The method of claim 10, wherein said data packets comprise one of resource reservation protocol, resource reservation protocol traffic engineering, and CR-LDP reservation messages.

14. A computational component for performing a method, the method comprising:
receiving at a communication endpoint a first data packet containing:
    a request for a reservation of network resources; and
    a first object in addition to the request for the reservation network resources, comprising a connection request, wherein said first object comprises a communications protocol object;
creating at said communication endpoint a second data packet containing:
    a response to said request for network resources; and
    a second object in addition to the response to said request for the reservation network resources, comprising a connection request acknowledgement, wherein said second object comprises a communications protocol object; and
receiving at said communication endpoint a third data packet containing:
    a confirmation of said reservation of network resources; and
    a third object in addition to the confirmation for the reservation network resources, comprising a second connection request acknowledgement, wherein said third object comprises a communications protocol object; wherein a communication channel is established between said first communication endpoint and a second communication endpoint by said objects comprising a connection request and connection request acknowledgement, and wherein bandwidth on said network is reserved by said messages comprising a resource reservation and confirmation of reservation of network resources.

15. The method of claim 14, further comprising:
sending data using said reserved network resources.

16. The method of claim 14, wherein said objects comprise one of transmission control protocol and session initiation protocol objects.

17. The method of claim 14, wherein said data packets comprise one of resource reservation protocol, resource reservation protocol traffic engineering, and CR-LDP reservation messages.

* * * * *